United States Patent [19]
Boria et al.

[11] Patent Number: 5,065,340
[45] Date of Patent: Nov. 12, 1991

[54] COHERENT GATE VESTA ENERGY PROCESSOR

[76] Inventors: John I. Boria, 5267 Calle Barquero, Santa Barbara, Calif. 93117; Robert T. Brown, 9460 Sunland Blvd., Sun Valley, Calif. 91352

[21] Appl. No.: 354,212

[22] Filed: May 19, 1989

[51] Int. Cl.$^5$ .......................... G06F 15/31; H04B 1/06
[52] U.S. Cl. ................................. 364/514; 364/222.2; 364/DIG. 1; 364/919; 364/919.5; 364/DIG. 2; 375/59; 455/67; 455/72; 395/800
[58] Field of Search ...................... 364/514, 919, 919.2, 364/919.5, 222.2; 375/7, 121, 59; 455/67, 72, 9, 12, 17

[56] References Cited
U.S. PATENT DOCUMENTS 4,536,846 8/1985 Raychaudhuri et al. ............ 364/514
4,789,948 12/1988 von der Embse .................. 364/514

Primary Examiner—Parshotam S. Lall
Assistant Examiner—Brian M. Mattson

[57] ABSTRACT

A system for the transmission and reception of wideband real time multi-channel signals for video, audio, facsimile and/or data information, over a single or multiple satellite transponder, or over a carrier of available bandwidth for program distribution using single sideband suppressed carrier amplitude modulation which requires, for example, only 6 MHz of radio frequency bandwidth to transmit a full NTSC color television channel and which permits the use of small apertured dishes and simple conversion for the consumer's television receiver, for a nationwide signal distribution or, wherever television reception is wanted, at an economical cost.

11 Claims, 5 Drawing Sheets

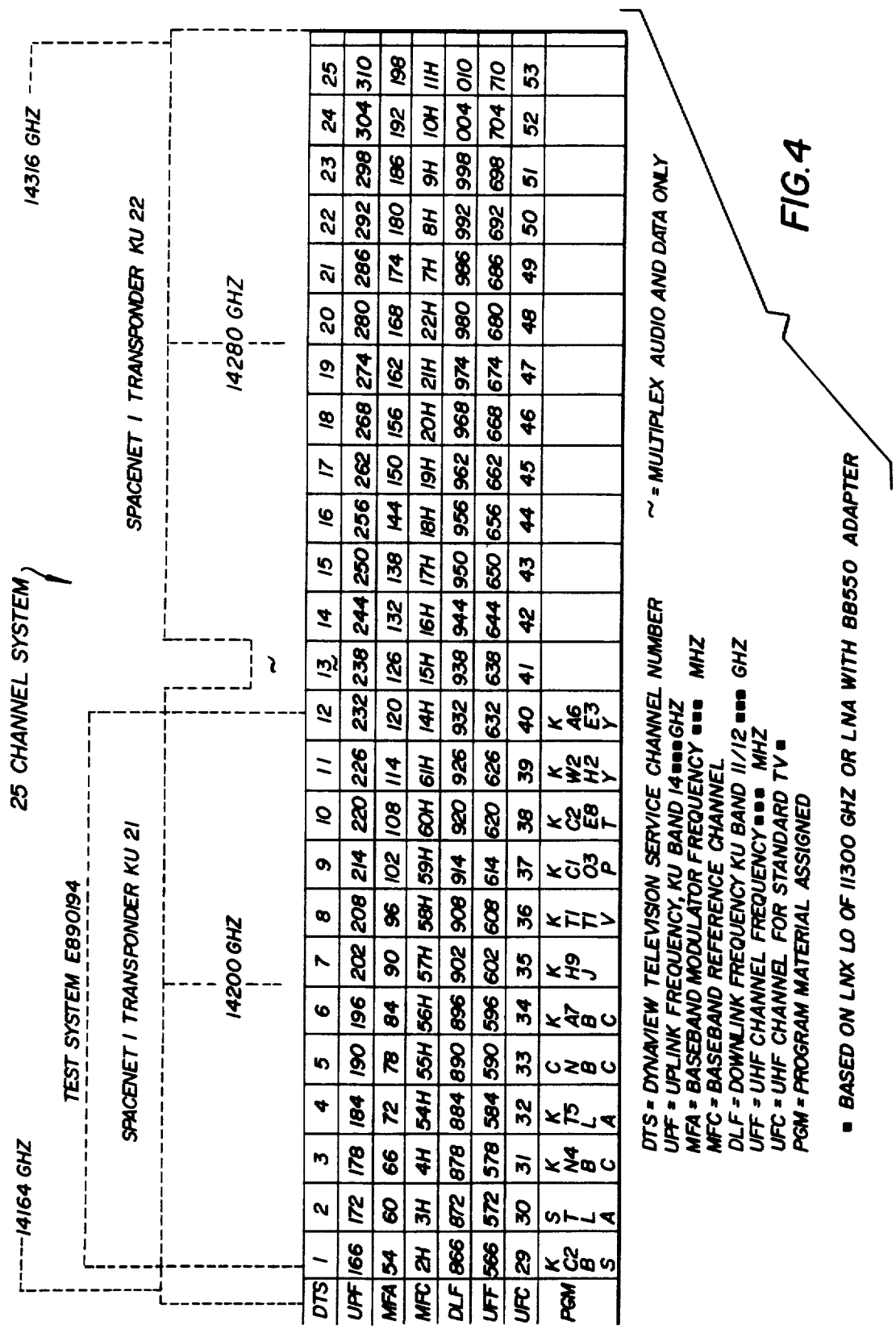

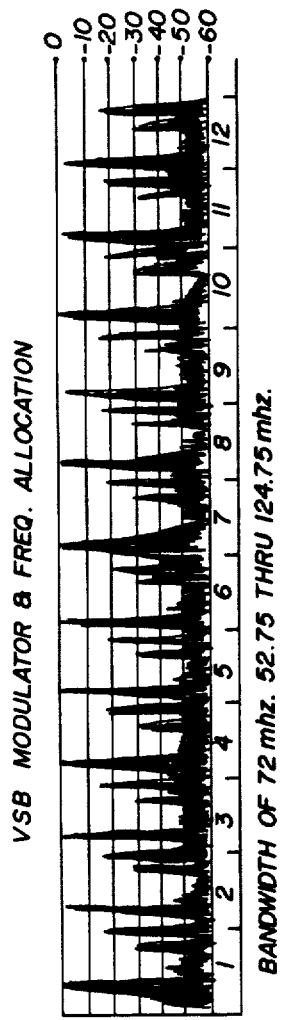
*FIG. 5A*
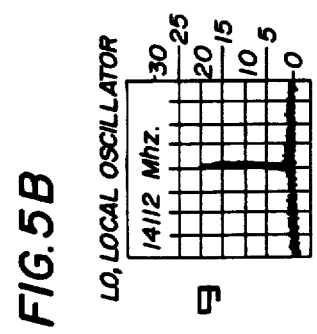
*FIG. 5B*
*FIG. 5C*
*FIG. 5E*
*FIG. 5F*
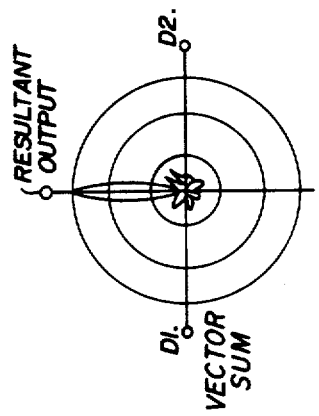
*FIG. 5D*

COHERENT GATE VESTA ENERGY PROCESSOR

BACKGROUND OF THE INVENTION

The CARS BAND, point-to-point, multi-channel systems, presently used by CATV-MATV networks around the country have, for many years, been an established means of providing for the distribution of a large number of television signals from a central point to several microwave receiver hubs, from which the signals are carried to the individual subscribers.

Historically, multi-channel cable and/or microwave television signal transmission has utilized standard modulator technology for terrestrial multi-signal transmission. In order to transmit multi-channel television signals to a satellite transponder, the signals must be coherent, phase locked, and level. To create coherent, phase locked and level multi-signals for satellite transmission, it is essential that frequency modulators be used.

The present invention overcomes a major disadvantage of prior art technology in that it enables multi-channel television signal transmission to be achieved via one satellite transponder, thus greatly reducing the cost of broadcasting and increasing the value of each transponder.

Such multi-channel television signal transmission is achieved in accordance with the invention by means of a unique system to be referred to herein as a COHERENT GATE VESTA ENERGY PROCESSOR. The number of channels to be transmitted by the system of the invention is limited only by the number of available sequential transponders. The particular system to be described in the present specification has the ability, for example, of transmitting twelve (12) channels of wide spectrum, coherent, phase locked and level television signals via one 72 MHz transponder.

The COHERENT GATE VESTA ENERGY PROCESSOR of the invention differs from the prior art systems in that, instead of using a terrestrial point-to-point microwave system, it uses a single, or multiple, communications satellite transponder, for each of the twelve television channels. The signals output from the COHERENT GATE VESTA ENERGY PROCESSOR of the invention are converted to compatible CATV/MATV channels at a "hub", or individual receiving point. The COHERENT GATE VESTA ENERGY PROCESSOR of the invention allows the use of small apertured dishes and simple conversion for the consumer's television receiver, for nationwide signal distribution or to wherever television reception is desired, on an economical basis.

SUMMARY OF THE INVENTION

A COHERENT GATE VESTA ENERGY PROCESSOR is provided which uses single-sideband, suppressed-carrier, amplitude modulation, which requires only 6 MHz of radio frequency bandwidth per channel to transmit a full NTSC color television channel. The satellite transponder used in the system to be described has a bandwidth of 72 MHz which allows for the transmission of twelve (12) 6 MHz channels. These twelve (12) channels provide the availability of assigning to one transponder any specific services or requirements. The COHERENT GATE VESTA ENERGY PROCESSOR of the invention may be adapted to any transmission mode and/or to any available bandwidth Program channels may be added and channel assignments may be changed at the up-link point without concern for interfaces other than at the up-link origination point. The foregoing is true regardless of the number of receivers being served or of the number of channels provided. These up-link signals may include multiple-tier for viewing addressability of video services, audio, facsimile and data or voice communications.

BRIEF DESCRIPTION OF THE DRAWINGS

FIG. 4 illustrates the spectral transponder frequency assignments for a typical COHERENT GATE VESTA ENERGY PROCESSOR system embodying the concepts of the invention; and FIGS. 5A-5F represent a series of waveforms and vector analyses useful in explaining the operation of the COHERENT GATE VESTA ENERGY PROCESSOR system of FIG. 2.

DETAILED DESCRIPTION OF THE ILLUSTRATED EMBODIMENT

Figure 1:
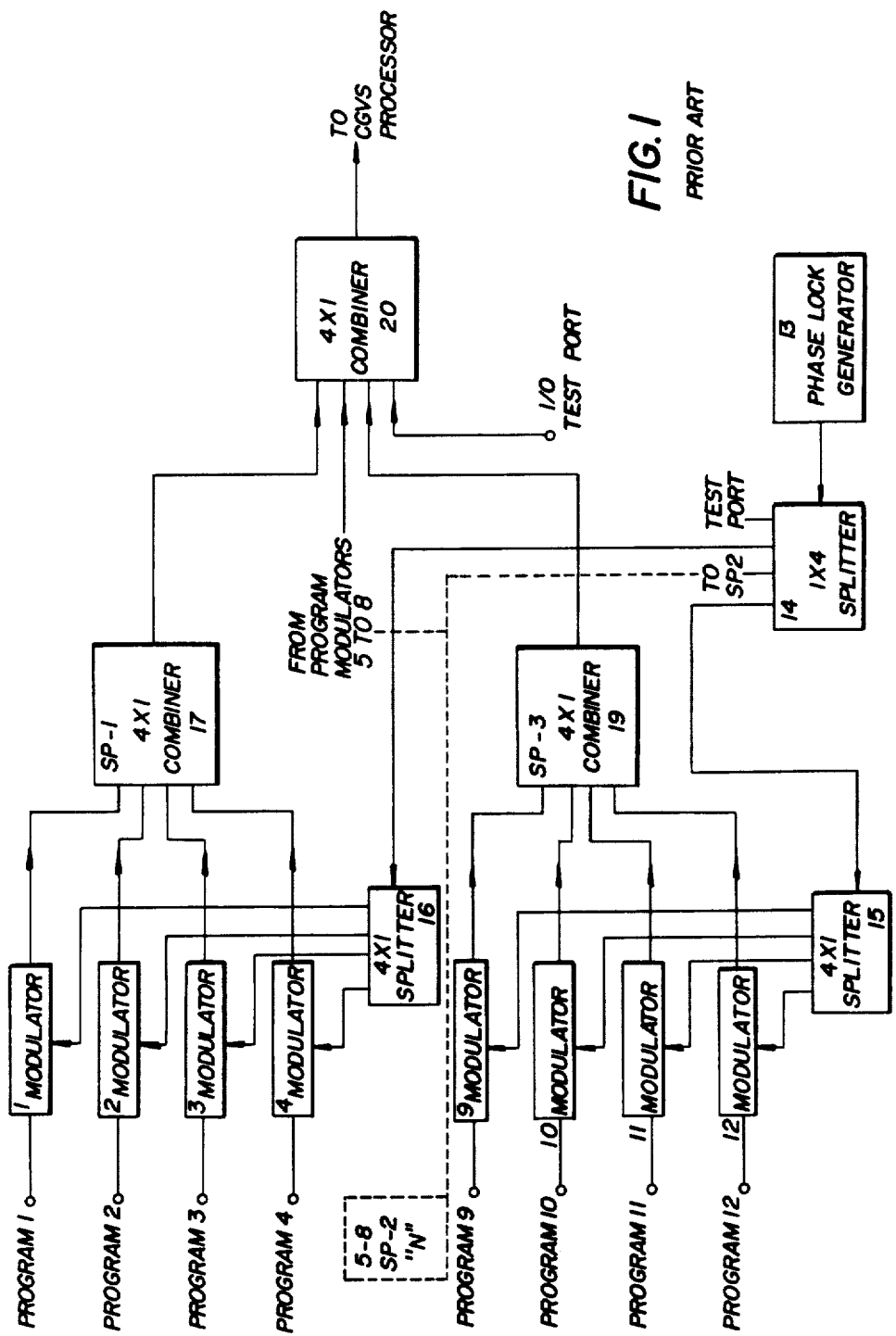
FIG. 1 is a schematic diagram of a prior art VSB frequency allegation and signal modulation system which serves as an input circuit for the COHERENT GATE VESTA ENERGY PROCESSOR of the invention.
Figure 2:
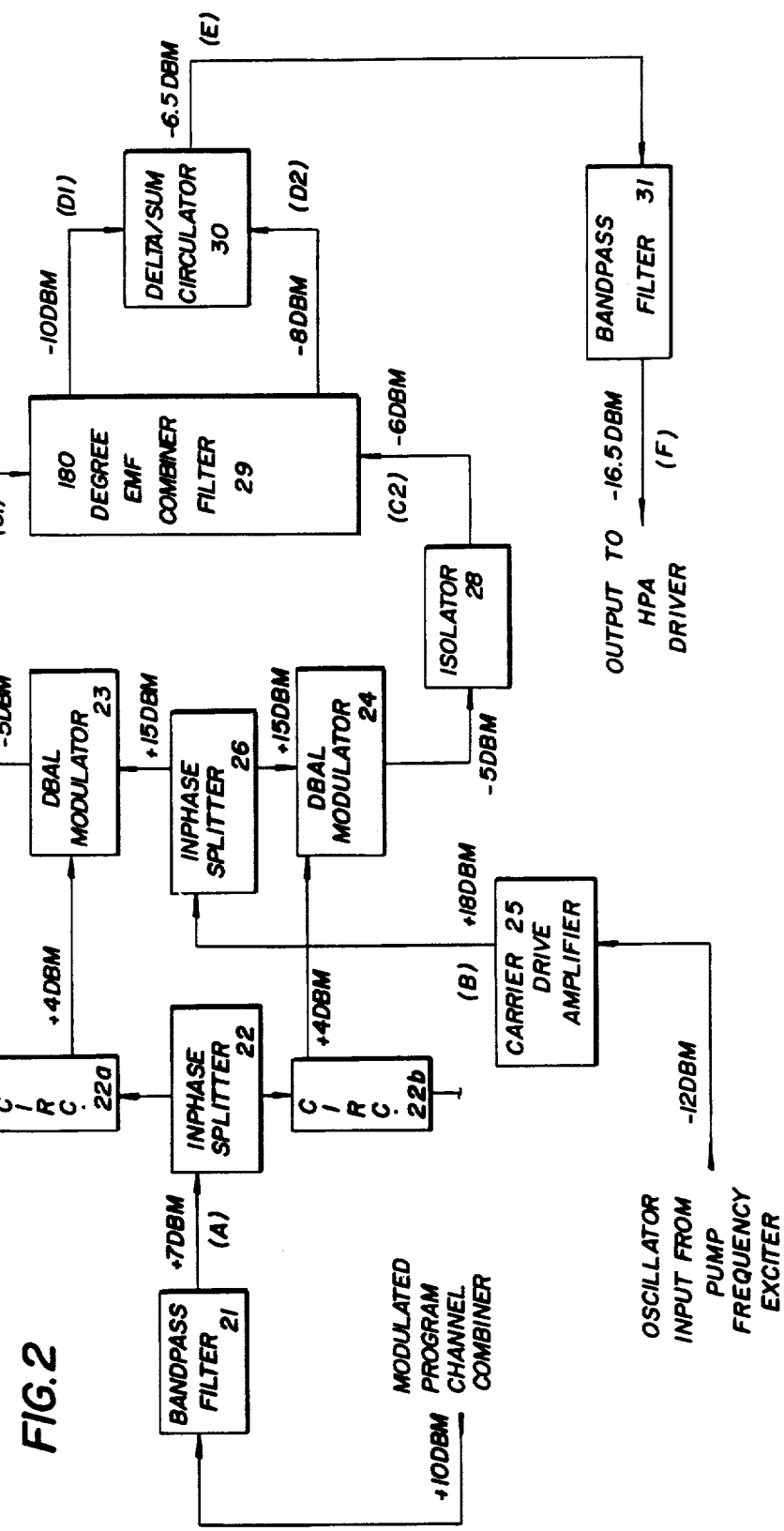
FIG. 2 is a block diagram schematically illustrating one embodiment of the COHERENT GATE VESTA ENERGY PROCESSOR of the invention.

As mentioned above, the prior art VSB modulator and frequency allocator of FIG. 1 serves as an input circuit for the COHERENT GATE VESTA ENERGY PROCESSOR of the invention, an embodiment of which is shown in FIG. 2. The VSB modulator and frequency allocator of FIG. 1, for example, processes signals representing twelve (12) separate programs of audio, video, data, facsimile information and the like, these being designated as PROGRAM 1-PROGRAM 12. These program signals are applied respectively to modulators 1-12.

The phase lock generator 13 feeds a reference frequency signal to the modulator through 1:4 splitters 14, 15 and 16 for stability lock purposes. The radio frequency outputs from modulators 1-12 are fed to 4:1 radio frequency combiners, such as combiners 17 and 19. These combiners, in each instance, combine the outputs of four modulators into one output.

The outputs of the aforesaid combiners are then fed to a further 4:1 combiner 20. The output of combiner 20 is the composite output of all twelve modulators 1-12. The modulated frequency of the output signal of combiner 20 is, for example, 52.75-124.75 MHz. This output comprises a set of wide spectrum phase locked sequentially assigned frequency coherent and level signals and will be referred to as the coherent gate vesta energy signal which is the essential energy for entry to the COHERENT GATE VESTA ENERGY PROCESSOR of FIG. 2. The output signal has a bandwidth, for example, of 72 MHz.

As stated, the VSB modulator and frequency allocator of FIG. 1 represents the input circuit for the program information, such as audio, video, data, FAX, or the like, which is to be transmitted over the system of the invention.

The modulators 1-12 of the modulator and frequency allocator input circuit of FIG. 1 are designed to accept the video, audio or specialized signals applied thereto and to convert the signals into the assigned frequency required for channelization of the system of the invention. For example, and as shown in the frequency chart of FIG. 4, channel No. 1 is assigned to a main frequency carrier of 54 MHz. This carrier is amplitude modulated and has a bandwidth of 4 MHz. A frequency modulated carrier is placed 4.5 MHz above the main carrier, in this example at 58.5 MHz. The frequency modulated carrier normally is modulated with the audio portion of the program material. However, it may carry any signal of audio bandwidth, such as data or a computer MODEM. The video and audio carriers may be configured for any program source material.

The output signal from the VSB modulator and frequency allocator of FIG. 1 is applied to a bandpass filter 21 of the COHERENT GATE VESTA ENERGY PROCESSOR of FIG. 2. This filter may be of the type designated ANZAC TP-75 MFC 3486-RF. This gate limits the frequency response to the required bandwidth, that is 50-130 MHz for the 72 MHz bandwidth of the VSB modulator and frequency allocator output signal.

The output signal of bandpass filter 21 (FIG. 5A) is applied to a 0° hybrid radio frequency in-phase splitter 22. Splitter 22 may be a Shuttercam RFS-250-0. Splitter 22 produces two in-phase output signals which are applied respectively through a pair of circulators 22a and 22b. The circulators may be of the type designated MSR-94375 to a pair of double balanced modulators 23 and 24. These modulators may be of the type designated WJ-M79HC. The modulators 23 and 24 convert the processed program signals of FIG. 5A to the assigned frequency of the transponder used in the system. The particular transponder, for example, has a center frequency of 14,200 MHz, and has a 72 MHz frequency bandwidth (14164 MHz-14,236 MHz).

A carrier drive amplifier 25 amplifies a local oscillator (pump frequency) signal derived from an appropriate source to the drive level required for the proper operation of modulators 23 and 24. Amplifier 25 may be of the type designated CAL AMP PO-S150446. The frequency of the local oscillator signal is off-set from the assigned operation frequency of the system and, in the present case, the pump frequency may be 14112 MHz (FIG. 5B). The pump frequency signal is applied to an in-phase splitter 26 which functions as a 0° power divider. Splitter 26 splits the pump frequency signal equally and in-phase to modulators 23 and 24. Splitter 24 may be of the type designated Anaren 40269.

The resultant outputs of modulators 23 and 24 comprise the twelve channels of information which are placed between 14164 MHz and 14236 MHz. The outputs from the modulators 23 and 24 are applied to respective ferrite directional couplers which serve as isolators 27 and 28. The outputs of the isolators are applied to a 180° EMF power combiner filter 29. The isolators permit the modulated signals from modulators 23 and 24 to flow in one direction only. The isolators may be of the type designated Addington 1011 02005. Filter 29 may be of the type designated Anaren 30070.

To understand the design and operation of the system, the operation of the components, individually and in combination, must be analyzed.

Each double-balanced modulator 23 and 24 is supplied by a radio frequency carrier or "pump" frequency signal. The pump frequency signal turns the diodes of the modulators on and off at the frequency required for proper operation of the modulators. The modulated inputs from in-phase splitter 22 are applied to the RF input ports of the respective modulators. These latter signals cause an imbalance in the diodes of the modulators at a frequency rate corresponding to the modulating frequency used in the system. The resultant of this operation appears at the respective radio frequency output ports of the modulators. This latter signal, in each instance, is the pump frequency ± the modulating frequency. In the present case, 14,112 MHz is the pump frequency, the upper side band is 14,164–14,236 MHz, and the lower side band is 13,988–14,060 MHz. This is a balanced circuit, and accordingly, the pump frequency is suppressed and eliminated. There are other by-products produced by the action, as shown in FIG. 5C. These are second and third order harmonics which are products of the conversion process. Such harmonics are detrimental to the main desired frequencies and appear as noise and interference in the program signals. Accordingly, they are suppressed in the system of the invention, as will be described.

The output of each of the modulators 23 and 24 of FIG. 2 is an in-phase radio frequency signal containing the twelve signals of information to be transmitted. This radio frequency energy, due to the normal variances in the modulators, is a combination of transverse and longitudinal waves. When the signals are combined, they cause a "pressure difference" or a vector energy zone. These non-linear phase shifts form 0-vector linear regions which interact on the electrons simultaneously pushing in opposite directions equally.

These highly non-linear dynamic areas act to provide a phase shifting between the composite substructure wave.

The phase shifts described above result in violations of the sum 0 conditions producing a "normal" EM wave which deposits energy in the out-of-phase area. This is referred to as a spin vortex concept. The out-of-phase condition means that there is now an alternating preponderance of spin holes, spinning first in one direction and then in the other. Thus, the electrons in the non-linear phase shift area are "hooked" and oscillated to and for producing energy.

The resulting energy field is combined in the 180° power combiner 29 of FIG. 2, thereby producing the vector sum and difference appearing at its output ports (FIG. 5D). By combining the signals appearing at the two output ports of the combiner in the phase coherent gyromagnetic resonance circulator 30 of FIG. 2, the unwanted intermodulation products are cancelled. As the 0 vector waves are actually in-phase with the desired signal at this point, they become additive at the output. This transmission does not exhibit the normal problem associated with wideband multimodulation techniques.

The output of circulator 30 is fed to the bandpass filter 31 of FIG. 2 which, as noted, is tuned to the transponder frequency. This filter eliminates the lower side band and any "out of band" information resulting from the modulation process. The output of filter 31 (FIG. 5F) is fed to the HPA (high power amplifier) of the system and associated antenna for satellite up-link for distribution to subscriber receivers.

As the foregoing is a wide band multi-format signal, the power output of the HPA must be reduced by 3 db or half power. In a test case, a 300 watt unit was used so that the maximum power input was held to 150 watts maximum. In testing the system in conjunction with a 2.4 meter antenna and using a transponder having an area DBW of 45, a signal-to-noise ratio of 36 dB was maintained on a 1 meter antenna receiver system. The transponder produced no detrimental effects to the system. By using a 5.6 meter antenna with two 600 phase combined high power amplifiers running at 400 watts input to the antenna, a minimum signal-to-noise ratio of 48 dB was maintained as reference on the 1 meter antenna test receiver system.

The coherent gate vesta energy signal produced by the system of FIG. 1 is a harmonic frequency assignment for energy at 6.0 MHz which may accommodate, for example, up to 80 channels of video, audio, data, or FAX information. This is achieved in a multiple transponder bandwidth of 480 MHz which may be adjusted to accommodate the bandwidth of any transponder mode. This coherent gate vesta energy signal assignment produces multiple channel transmission for any specified bandwidth to any number of adjacent transponders with known bandwidths or individual transponder capacity.

It is necessary to split the coherent gate vesta energy signals into two equal and coherent gate vesta energy sources in order to drive the modulators 23 and 24. As described, these modulators serve to up-convert or down-convert the energy signal in preparation for combining and elimination of undesired signal elements in filter 29 and circulator 30. The modulated signals from the modulators are equal and coherent sources of energy. These signals are processed through the electromotive force combiner filter 29, which serves as an energy mixer and combines the desired coherent energy signals to result in a set of amplified and accelerated energy signals.

At the same time, the combiner filter 29 inversely separates the desired energy signals from the undesired non-coherent energy signals and feeds the desired energy signals to one output port and the inverted undesired energy signals to a separate output port. The two output ports are coupled to the phase coherent gyromagnetic resonant circulator 30 which, as described, combines the desired and undesired energy signals and serves to produce a resultant output of twice the energy normally available to drive the transmitter with the undesired harmonic elements being suppressed to approximately one-third normal level.

The operation described above results in the production of stepped up energy for driving the transmitter and in the suppression of the undesired harmonics. Only after the coherent gate vesta energy signals have been so processed is it possible to transmit multi-channel audio, video, data and FAX signals via one transponder which normally carries but one channel.

The system of the invention, without compressing the signals, takes any audio, video, data and/or facsimile signal and combines the signals for transmission in real time over any transponder bandwidth. The required space of the signals and the known bandwidth of the transponder are the only known limitations to transmitting the desired information by this technology. Using the technology of the invention, the dimensions of the signals may be altered without altering the time of each signals normal expression.

In the system of the invention, the gate vesta energy signal is processed through (a) an additive mixer, (b) a local oscillator selected for a specific system output, and (c) a specialized combiner filter which produces a conversion of the signal resulting in a standard direct output to a normal television receiver or system. By use of the COHERENT GATE VESTA ENERGY PROCESSOR technology of the invention, twelve channels of audio, video, data or facsimile signals, for example, may be transmitted where only one or two equivalent signals have been transmitted in the past. Using the COHERENT GATE VESTA ENERGY PROCESSOR of the invention and tiering, twenty-five (25) coherent gate vesta energy signals may be placed in a bandwidth space normally/historically occupied by two standard television signals using two transponders.

Constant coverage and quality of the signals is maintained throughout the satellite footprint by the use of the COHERENT GATE VESTA ENERGY PROCESSOR system of the invention. The COHERENT GATE VESTA ENERGY PROCESSOR technology of the invention permits the number of 6 MHz bandwidth signals transmitted to be multiplied by the availability of the transmitters bandwidth up to, for example, 480 MHz or 80 channels. The COHERENT GATE VESTA ENERGY PROCESSOR of the invention can be equally applied to all known electronics design technology including but not limited to solid state, optical magnetic and any physical technology.

Figure 3:
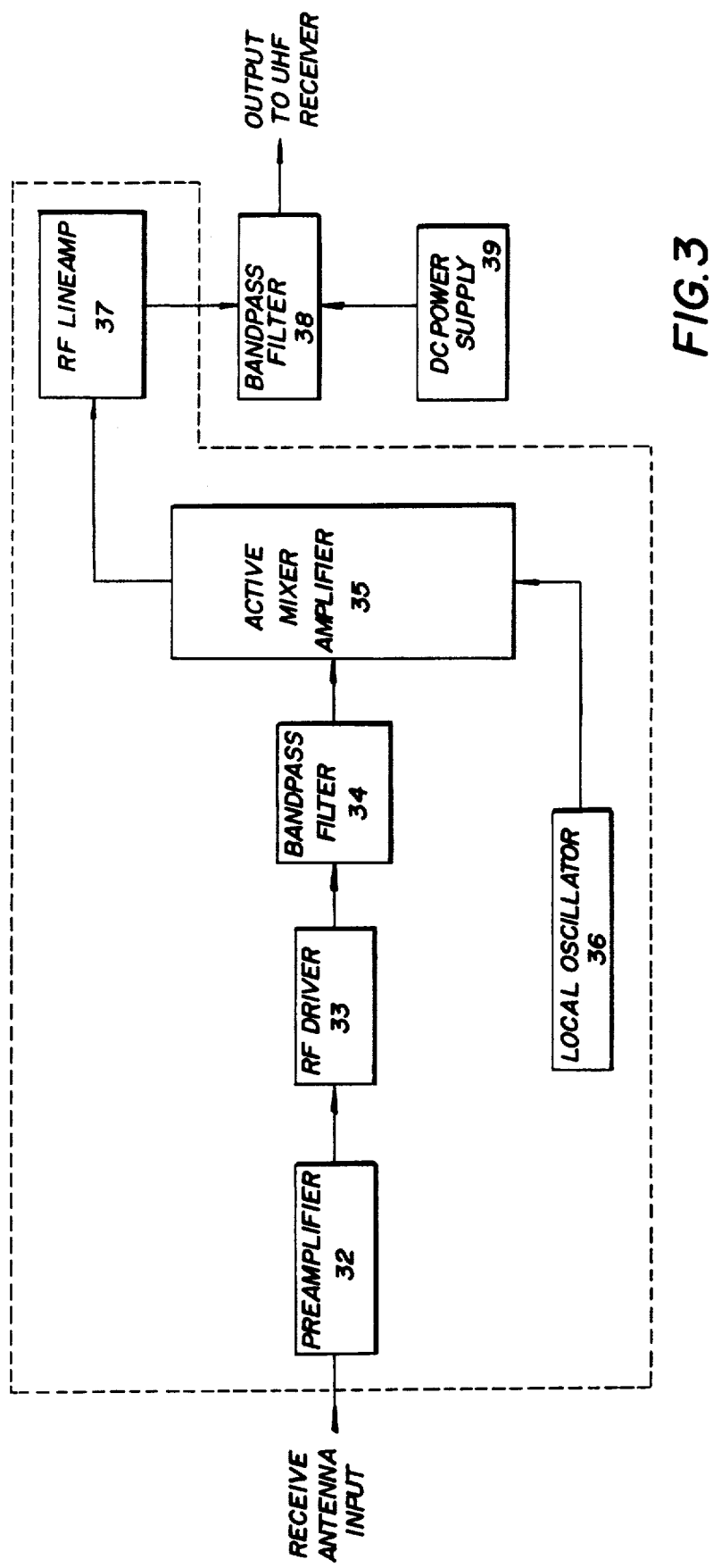
FIG. 3 is a block diagram schematically illustrating a COHERENT GATE VESTA ENERGY PROCESSOR receiver used in the practice of the invention.

A conversion receiver for processing the signals received from the up-link and relayed through the assigned transponder is shown in FIG. 3. The signals are received by way of an LNX low noise converter. The converter comprises a pre-amplifier 32 which drives a radio frequency driver 33. The radio frequency driver 33, in turn, is coupled to a band-pass filter 34 which is tuned to the selected operating receiver frequency and which has a bandwidth equal to the total bandwidth of the program channels transmitted from the up-link and relayed through the assigned transponder. The resultant signals are now at the proper level for conversion, for example, to standard UHF television channels.

To facilitate the conversion process, bandpass filter 34 is coupled to an active hybrid mixer amplifier 35. Mixer amplifier 35 accepts the output from the bandpass filter 34 and mixes the output with a signal derived from a local oscillator 36. The local oscillator operates at a fixed frequency below the predetermined receive frequency. This provides a resultant output of the hybrid mixer amplifier 34 which comprises a band of frequencies which are acceptable to the UHF input of a standard television receiver. For example, a receive frequency of 11900 MHz minus a local oscillator frequency of 11300 MHz results in a frequency of 600 MHz, or channel 35 on the UHF portion of a standard television receiver.

The UHF output signal from amplifier 35 is applied to a radio frequency line amplifier 37, which amplifies the UHF signals to the distribution level. The amplified UHF signals from line amplifier 37 are fed to a bandpass filter 38, which eliminates all signals above and below the selected program channels. In the present case, for example, the bandwidth is 564 MHz-636 MHz. The output of a direct current power supply 39 is applied to the bandpass amplifier 38. This power supply supplies the power required by the LNX.

The processed signals described above meet the requirements for standard NTSC television broadcast. They may be delivered to the subscriber by any usual means. The subscriber may be an individual or group, fixed or mobile. Program channels may be added and channel assignments changed at the up-link without concern for interfaces other than at the up-link origination point. This is true regardless of the number of receivers being served or the number of channels provided to the subscriber. These program signals may include multiple-tier scrambling, pay-per-view, addressability, premium audio and video services, data and voice communication.

The invention provides, therefore, a COHERENT GATE VESTA ENERGY PROCESSOR system which uses single-side band, suppressed-carrier, amplitude modulation, and which requires only 6 MHz of radio frequency bandwidth per channel to transmit a full NTSC color television channel or other information. It is evident that although a particular embodiment of the system of the invention has been shown and described, modifications may be made. It is intended in the claims to cover all modifications which come within the true spirit and scope of the invention.

We claim:

1. A communication system for use in conjunction with a transponder means of a particular capacity and having separate information channels including: modulation and frequency allocator input circuit means for receiving a plurality of separate program signals representing different information channels having a particular total bandwidth, and which includes modulator means, and combiner means coupled to said modulator means for combining said program signals into a coherent gate vesta energy output signal; and energy processor means coupled to said input circuit means and responsive to said coherent gate vesta energy output signal for producing a wide-band multiple channel signal corresponding to the capacity of the transponder means for distributing said separate program signals via satellite uplink to subscriber receivers.

2. The communication system defined in claim 1, in which said input circuit means includes circuitry for producing a coherent gate vesta energy output signal which comprises a set of wide spectrum phase locked sequentially assigned frequency coherent signals.

3. The communication system defined in claim 2, in which said coherent gate vesta energy processor means responds to said coherent gate vesta energy signal from said input circuit means for enhancing desired coherent energy components thereof and for suppressing undesired non-coherent components thereof.

4. The communication system defined in claim 2, in which said coherent gate vesta energy processor means comprises: a pair of double-balanced modulators; in-phase splitter circuit means coupled to said modulators and responsive to said coherent gate vesta energy signal from said input circuit means for splitting said signal into two equal and coherent gate vesta energy sources.

5. The communication system defined in claim 4, in which said double-balanced modulators serve respectively to up-convert and down-convert the frequency of said coherent gate vesta energy signal.

6. The communication system defined in claim 4, in which said coherent gate vesta energy processor means includes combiner filter means coupled to said double-balanced modulators for processing the signal therefrom so as to produce desired coherent energy components of said signal at a first output port and undesired non-coherent energy components thereof at a second output port.

7. The communication system defined in claim 6, in which said coherent gate vesta energy processor means includes further means coupled to the output ports of said combiner filter means to enhance the desired coherent energy components and to attenuate the undesired non-coherent energy components.

8. The communication system defined in claim 7, in which said further means comprises a delta/sum magnetic resonant circulator.

9. The communication system defined in claim 2, in which said coherent gate vesta energy processor means includes: a pair of double-balanced modulators; in-phase splitter circuit means coupled to said modulators and responsive to said coherent gate vesta energy signal from said input circuit means for splitting said signal into two equal coherent gate vesta energy sources, and to cause said double-balanced modulators respectively to up-convert and down-convert the frequencies of said coherent gate vesta energy signal; combiner filter means coupled to said double-balanced modulators for processing the signal therefrom so as to produce desired coherent energy components of said signal at a first output port and undesired non-coherent energy components of said signal at a second output port; and further means coupled to said output ports of said combiner filter means to enhance said desired coherent energy signal components and to attenuate said undesired non-coherent energy signal components.

10. The communication system defined in claim 9, in which said further means comprises a delta/sum magnetic resonant circulator.

11. The communication system defined in claim 1, and which includes a subscriber conversion receiver including: a bandpass filter tuned to a selected operating receive frequency and having a bandwidth equal to the total bandwidth of the information channels transmitted by the signal; and heterodyne circuit means coupled to said bandpass filter means and responsive to the output therefrom to provide a band of frequencies acceptable to the input of a selected present-day information receiver.

* * * * *